US008894808B2

(12) United States Patent
Seiche et al.

(10) Patent No.: US 8,894,808 B2
(45) Date of Patent: Nov. 25, 2014

(54) METHOD AND APPARATUS FOR PREPARING FOLD LINES

(75) Inventors: Werner Seiche, Bergheim (DE); Toma Schneider, Dresden (DE); Jörg Berger, Jülich (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 555 days.

(21) Appl. No.: 13/125,107

(22) PCT Filed: Sep. 18, 2009

(86) PCT No.: PCT/DE2009/001337
§ 371 (c)(1), (2), (4) Date: Dec. 1, 2011

(87) PCT Pub. No.: WO2010/045909
PCT Pub. Date: Apr. 29, 2010

(65) Prior Publication Data

US 2012/0071312 A1 Mar. 22, 2012

(30) Foreign Application Priority Data

Oct. 20, 2008 (DE) ........................ 10 2008 053 784

(51) Int. Cl.
*B32B 38/10* (2006.01)
*B31B 1/26* (2006.01)
*B31F 1/00* (2006.01)

(52) U.S. Cl.
CPC ................ *B31F 1/0012* (2013.01); *B31B 1/26* (2013.01); *B31B 2201/26* (2013.01)
USPC .......................................... 156/711; 156/226

(58) Field of Classification Search
USPC ........................................................ 156/711
See application file for complete search history.

(56) References Cited

U.S. PATENT DOCUMENTS

| | | | | | |
|---|---|---|---|---|---|
| 2,256,263 | A | | 9/1941 | Haycock | |
| 2,647,666 | A | * | 8/1953 | Friedler | 223/89 |
| 3,800,677 | A | | 4/1974 | Jones et al. | |
| 4,979,932 | A | * | 12/1990 | Burnside | 493/134 |
| 5,580,097 | A | * | 12/1996 | Latvakangas et al. | 281/29 |
| 5,716,473 | A | | 2/1998 | Gordon et al. | |

FOREIGN PATENT DOCUMENTS

| | | | | |
|---|---|---|---|---|
| GB | 1402871 | A | * | 8/1975 |
| JP | 60036134 | A | * | 2/1985 |

* cited by examiner

*Primary Examiner* — Mark A Osele

(74) *Attorney, Agent, or Firm* — Lucas & Mercanti, LLP; Klaus P. Stoffel

(57) ABSTRACT

The method and the apparatus are used for preparing fold lines on laminated materials on the basis of cardboard. At least one region intended for providing the fold line is subjected to heat such that an at least partial local reduction of shear fracture stresses of the material is produced in said region. The application of heat is done using a heating device, which is disposed adjacent to a guide device for the laminate. The local reduction of the shear fracture stresses supports local delamination, which supports the formation of a folding joint.

11 Claims, 2 Drawing Sheets

METHOD AND APPARATUS FOR PREPARING FOLD LINES

The present application is a 371 of International application PCT/DE2009/001337 filed Sept. 18, 2009, which claims priority of DE 10 2008 053 784.5, filed Oct. 20, 2008, the priority of these applications is hereby claimed and these applications are incorporated herein by reference.

BACKGROUND OF THE INVENTION

The invention pertains to a method for preparing fold lines in laminated materials based on cardboard for the production of containers.

The invention also pertains to an apparatus for preparing fold lines in laminated materials based on cardboard for the production of containers.

The invention also pertains to fiber composites with thermally activatable solvents in conjunction with a vapor barrier to prevent the escape of the solvent.

In the production of packages of cardboard, blanks are produced out web material during the course of a first production step, and then the blanks are usually provided with folds so that the cardboard composite can be folded to form the container to be produced. When a cardboard composite of the laminated type is folded, both elastic and plastic stresses develop in the area of the fold. The plastic stresses can lead to displacements of the material in the area of the fold joint. The material displacements generate shear stresses between the individual fiber layers of the cardboard up to a material-dependent limit value.

When the limit, i.e., the so-called “shear fracture stress” value, is exceeded, the layers of material delaminate.

SUMMARY OF THE INVENTION

The goal of the present invention is to improve a method of the type described above in such a way that a locally specifiable decrease in the shear fracture stress promotes local delamination within this zone and thus supports the formation of the fold joint.

This goal is achieved according to the invention in that at least one area intended for the preparation of a fold line is subjected to heat in such a way that bonds within the laminate are partially and temporarily broken, which thus promotes the at least partial delamination of the material in this area.

Another goal of the present invention is to design an apparatus of the type indicated above in such a way that the formation of a fold joint is supported in a specifiable manner.

This goal is achieved according to the invention in that a heating device is arranged adjacent to a guide device for the laminate to be provided with the fold line, the heating power of the device being sufficient in at least a certain area to break the bonds within the laminate in a specifiable manner in the area of the fold line.

The idea specifically is to promote local delamination within the affected zone by bringing about a local, predetermined decrease in the shear fracture stress, which thus supports the formation of the fold joint.

Another of the key ideas is to treat the area in question with heat in such a way that the bonds within the laminate are partially and temporarily broken, which thus promotes the formation of the fold joint.

“Delamination” is to be understood here in particular as the separation of individual layers within the laminate from each other.

The inventive breaking of bonds within at least a certain area of the material where the fold line is to be formed supports the formation of the desired fold joint. A reversible decrease in both stiffness and strength is produced, which promotes local delamination under the effects of external mechanical load. The idea specifically is to conduct the thermal treatment of the laminate dynamically according to the thermoshock principle, because in this way it is possible to take into account the heat equalization processes in the composite cardboard material.

The thermally assisted folding of the laminate makes it possible to achieve a series of advantages. First, the leak-tightness of the package is improved, because, in contrast to the conventional method of preparing fold lines by scoring, the damage to the material can be significantly reduced. In comparison to the production of fold lines exclusively by scoring, furthermore, the inventive method also makes it possible to avoid geometric limitations with respect to the scorable area.

Because the laminate undergoes a process of plastification and then re-elastification, the material stresses which are present in the coating are relaxed, which leads to even further improvement in the leak-tightness of the package. It is also possible to achieve an increase in the stiffness of the edges of the package. The reduction in the damage to the material mentioned above with respect to the leak-tightness of the package also leads to an increase in the stability of the package.

Thermal preparation of the fold lines makes it possible to obtain larger process windows for downstream processing steps. It is to be observed in general that the recovery time of the material is increased and the recovery moment is decreased. This means that, for example, the pressing time during a downstream sealing operation can be reduced.

In cases where the performance of an additional mechanical scoring operation is completely eliminated, it is possible to integrate the fold line preparation step into a previously existing process step and thus to reduce the total number of steps required. For example, the hot-air activation head used to form the bottom of the package can also be used to prepare the fold lines.

Thermal fold line preparation also makes it possible to produce packages with a large number of additional shapes. In particular, it is possible to realize a wide variety of different fold pattern geometries.

As a result of the locally promoted delamination, the material can be folded without damage, and the formation of the fold joint is thus supported.

Forming a fold joint containing a hollow space contributes to an increase in stability.

According to one embodiment, a reversible decrease in stiffness is produced by the thermal treatment.

To generate a temperature profile with a high temperature gradient in the primary plane of the flat material to be formed, the heating is conducted dynamically by the thermoshock principle. This has the effect of minimizing the thermodynamic equalization processes. It is also possible to generate a temperature profile in the thickness direction of the package material.

A completely reversible decrease in stiffness can be achieved by heating the laminate to a temperature of no more than 100° C. in the heating area.

Evaporation of the residual moisture from the cardboard can be achieved by heating the laminate to a temperature of 110-120° C. in the heating area.

To assist the breaking of the bonds between the individual layers of fiber material, it is proposed that the laminate be heated to a temperature above 120° C. in the heating area.

The strength in the area of the fold line is decreased by evaporating at least some of the residual moisture from the Laminate by means of a temperature treatment.

In particular, the water vapor thus formed can be used to split the fiber bonds in the laminate.

To prepare a fold joint, the idea specifically is to separate the layers of the laminate from each other at least in certain areas by means of the delamination treatment.

In terms of apparatus, the method can be accomplished by using a hot air nozzle to apply the thermal treatment.

According to a variant of the method, mechanical scoring is also carried out in the area of the fold line in addition to the thermal treatment.

Designing the heating device as a microwave generator also makes it possible to evaporate residual moisture.

According to another variant, it is also possible to design the heating device as an IR emitter, as a laser, or as a thermal contact heater.

DETAILED DESCRIPTION OF THE INVENTION

Figure 1:
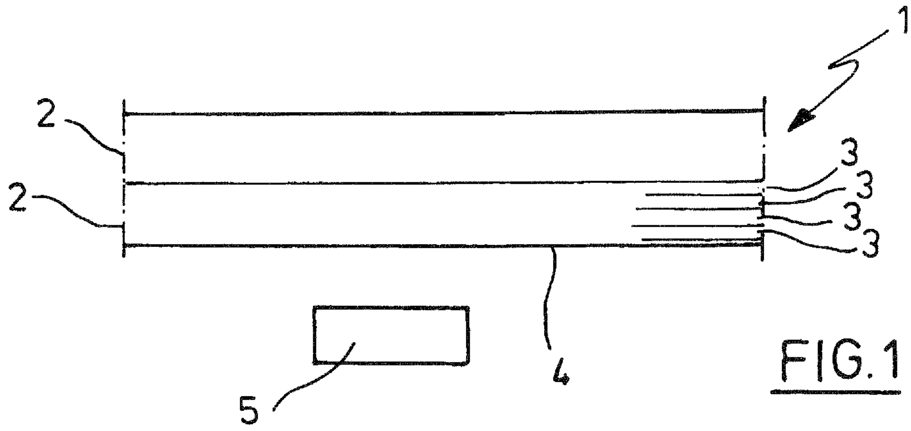
FIG. 1 shows a partial cross-sectional diagram of a laminate with the associated heating device.

According to the embodiment shown in FIG. 1, a laminate 1 consists of layers 2, which can themselves be formed out of one or more plies 3. A heating device 5 is positioned adjacent to a surface 4 of the laminate 1.

The heating device 5 is designed to introduce thermal energy into the laminate 1. The heating device 5 can be designed as, for example, a hot-air nozzle, a microwave source, an IR emitter, a laser, or a thermal contact heater. The idea specifically is to move the laminate 1 relative to the heating device 5 during the performance of the heating operation.

Figure 2:
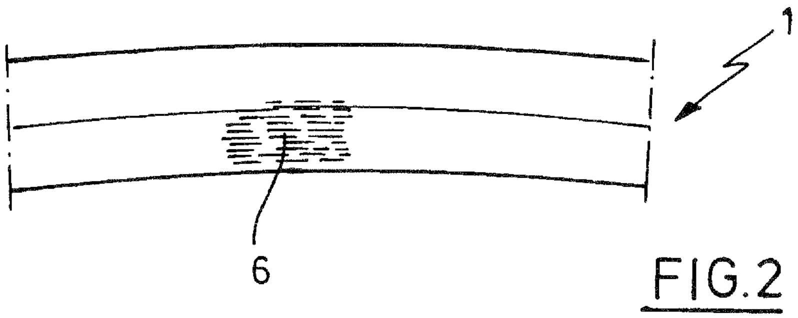
FIG. 2 shows the laminate according to FIG. 1 after the start of the folding process, the heated area being clearly marked out.
Figure 3:
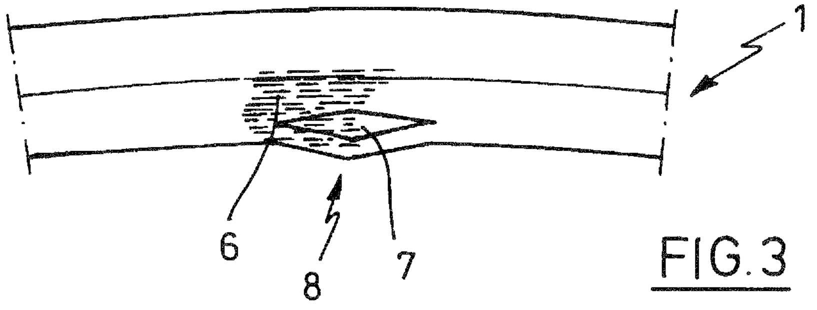
FIG. 3 shows the laminate according to FIGS. 1 and 2 after a continuation of the folding operation and after the beginning of the delamination of a certain area.

According to the diagram in FIG. 2, the laminate 1 has already been bent slightly. The heating area 6 is sketched in FIG. 3 shows the laminate 1 after continuation of the bending operation. In the heating area 6, i.e., in the area surrounding the heating area 6, partial delamination has occurred, which leads to the formation of a hollow space 7.

Figure 4:
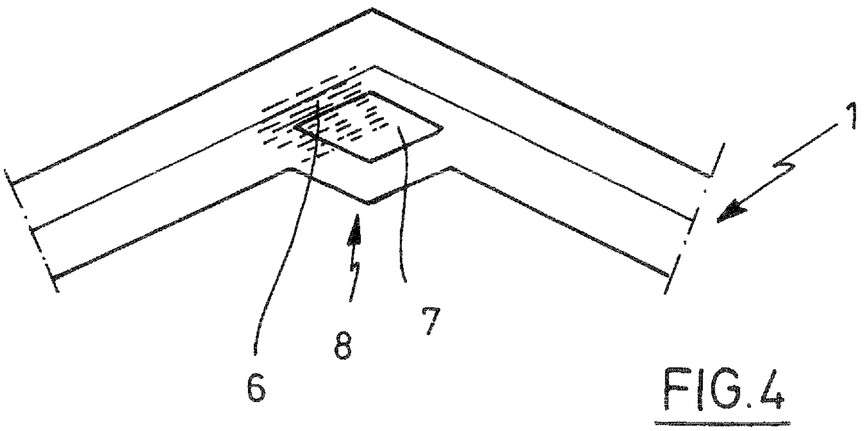
FIG. 4 shows the laminate according to FIGS. 1-3 after the end of the folding operation and the formation of the fold joint.

FIG. 4 shows the laminate 1 after further continuation of the folding operation. A fold joint 8 has thus been created, which forms the boundaries of the hollow space 7.

The formation of the fold joint 8 can be effectively controlled by adjusting the degree to which the laminate is heated by the heating device 5. When a laminate 1 in the form of a cardboard composite is heated to a temperature below 110° C., a reversible decrease in stiffness is produced. At a temperature between 110° C. and 120° C., the residual moisture in the cardboard begins to evaporate but without the vapor pressure having a chance to equalize.

The laminate 1 is usually provided with a polyethylene coating, and this coating is at least partially melted. This results in a decrease in the stiffness of the laminate 1. In addition, some of the fiber bonds of the cardboard are broken, as a result of which the stiffness also decreases slightly. The melting of the polyethylene coating also leads to a decrease in the effective material thickness and thus to a decrease in the resulting cross section of the bending beam. As a result, the static resistance moment to bending is reduced, so that, again, a decrease in stiffness is obtained. The re-elasticizing of the polyethylene in its deformed state counteracts the recovery forces of the cardboard. The packaging produced by the folding is thus stabilized.

Heating the laminate 1 to a temperature above 120° C. promotes the process of thermal delamination. The residual moisture in the cardboard is converted to vapor at such a temperature, so that the partial pressure of the water vapor supports the splitting of the cardboard fiber bonds. Because the layers 2 of the cardboard material are made up of individual plies 3, the number of bonds among the individual material fibers between the individual plies 3 is smaller than the number of bonds within a ply 3. Through the action of the free water vapor, the number of existing bonds is decreased, and thus the shearing and tensile fracture stresses are reduced. The flexural moment required to form the fold joint 8 is decreased.

New fiber bonds are usually formed after the water vapor has cooled and condensed.

The use of thermofolding to produce a package with flat ends and/or a gable shape makes it easy to fold the narrow sides symmetrically.

Figure 5:
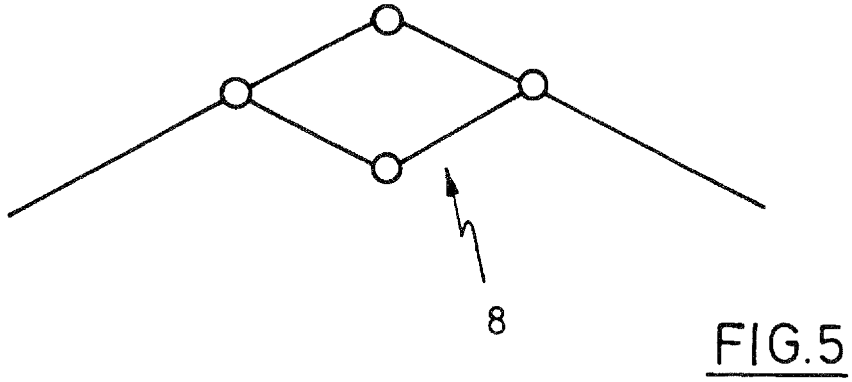
FIG. 5 shows a schematic diagram of the formation of a fold joint.
Figure 6:
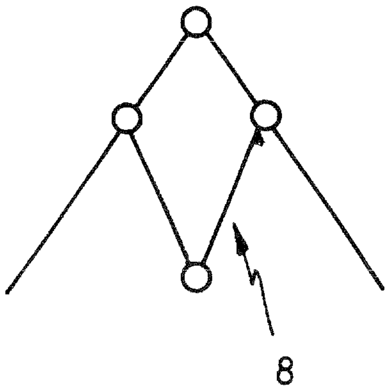
FIG. 6 shows the fold joint according to FIG. 5 after continuation of the folding operation.
Figure 7:
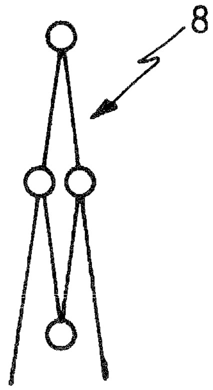
FIG. 7 shows the fold joint according to FIGS. 5 and 6 in the state of maximum folding.

In further illustration of the principle of a fold joint 8, FIG. 5 shows a schematic diagram of a predetermined fold state. FIG. 6 shows the fold joint 8 according to FIG. 5 at a higher degree of folding, and FIG. 7 shows the fold joint 8 after it has been folded by nearly the maximum amount. The lengths of the four sides of the fold joint 8 shown here remain essentially the same; only the angles between the individual sides change.

The invention claimed is:

1. A method for preparing fold lines in laminated materials based on cardboard for producing containers for foodstuff, the laminated materials having an inner layer and an outer layer, wherein the inner layer is formed from at least two plies, the method comprising the step of thermally treating at least one area intended for preparation of a fold line for producing a corner region of the container so that shear fracture stresses of the material are at least partially decreased locally in this area, as a result of which local delamination in this area is supported, wherein, as a result of delamination in the corner region an inner ply of the inner layer of the laminate is partially separated from a neighboring ply of the inner layer in an outer direction of the laminate so that the inner ply of the inner layer extends away from the neighboring ply in the corner region so as to form a hollow space between the inner ply and the neighboring ply.

2. The method according to claim 1, including supporting formation of a fold joint by a local decrease in the shear fracture stresses.

3. The method according to claim 1, wherein the thermal treatment produces a local, reversible decrease in stiffness and strength.

4. The method according to claim 1, further including carrying out a dynamic temperature treatment.

5. The method according to claim 4, including heating the laminate in a heating area to a temperature of no more than 100° C.

6. The method according to claim 4, including heating the laminate in a heating area to a temperature of 110-120° C.

7. The method according to claim 4, including heating the laminate in a heating are to a temperature of more than 120° C.

8. The method according to claim 4, wherein the temperature treatment results in evaporation of at least some residual moisture in the laminate.

9. The method according to claim 1, wherein fiber bonds in the laminate are broken.

10. The method according to claim 1, wherein, the thermal treatment is carried out using a hot-air nozzle.

11. The method according to claim 1, further including, in addition to the thermal treatment, mechanically scoring in the area of the fold line.

* * * * *